UNITED STATES PATENT OFFICE.

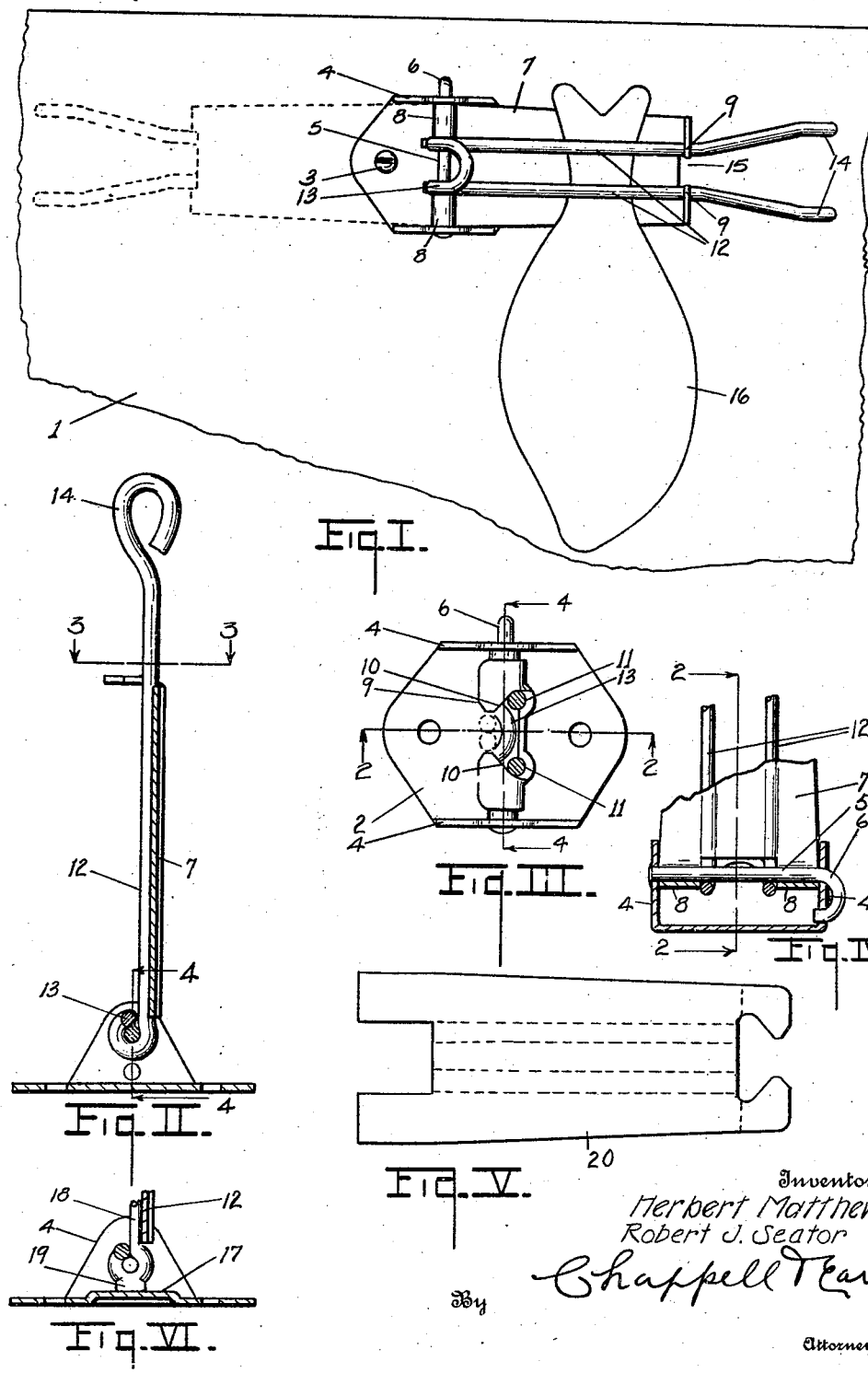

HERBERT MATTHEWS AND ROBERT J. SEATOR, OF BATTLE CREEK, MICHIGAN.

FISH HOLDER.

1,418,595.          Specification of Letters Patent.          Patented June 6, 1922.

Application filed September 26, 1921. Serial No. 503,153.

*To all whom it may concern:*

Be it known that we, HERBERT MATTHEWS and ROBERT J. SEATOR, citizens of the United States, residing at Battle Creek, county of Calhoun, State of Michigan, have invented certain new and useful Improvements in Fish Holders, of which the following is a specification.

This invention relates to improvements in fish holders.

The main objects of this invention are:

First, to provide an improved holder for use in dressing fish by means of which a fish may be effectively held for scaling and the other dressing operations.

Second, to provide an improved holder for use in dressing fish which may be quickly manipulated to secure and release a fish and one which is simple and economical in structure.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawings, forming a part of this application, in which:

Fig. I is a plan view of our improved fish holder, the base board or plate being partially broken away, a fish being indicated in outline in the holder, the holder being shown in one position by full lines and in another position by dotted lines.

Fig. II is a vertical central section with the holder adjusted to a vertical position, the base board being omitted, the section being on line 2—2 of Figs. III and IV.

Fig. III is a sectional view on a line corresponding to line 3—3 of Fig. 2.

Fig. IV is a fragmentary view partially in vertical section on a line corresponding to line 4—4 of Figs. II and III.

Fig. V is a plan view of the sheet metal blank from which the holder proper is formed.

Fig. VI is a detailed vertical section corresponding to that of Fig. II of a modified form or embodiment of our invention.

In the drawings similar reference characters refer to similar parts throughout the several views, and the sectional views are taken looking in the direction of the little arrows at the ends of the section lines.

Referring to the drawings, the base plate 1 is preferably a board of suitable dimensions to permit the holder being mounted thereon, and to serve as a support for a fish held by the holder for scaling and other dressing operations. Near one end of this base board or plate, and centrally thereof, we mount a bracket 2 by means of screws 3, the bracket having upwardly projecting ears 4 carrying the pivot 5, the pivot having a hooked end 6 engaging with one of the ears thereby preventing rotation of the pivot.

The holder member 7 is preferably formed of sheet metal as illustrated, and is provided with spaced knuckles 8 frictionally engaging the pivot so that it is held in its adjusted position.

The holder is provided with forwardly projecting spacing opposed lugs 9 at its outer end, the lugs having rearwardly inclined surfaces 10 (see Figs. I and III), the holder being also preferably provided with longitudinal grooves 11, adapted to receive the clamping arms 12.

In the structure illustrated, these clamping arms are formed of a piece of wire, bent upon its end having an eye 13 formed at its bight end engaging the pivot between the knuckles 8 so that the arms may be swung with or independently of the holder 7. These arms have finger pieces 14 at their outer ends so that they may be grasped and brought together to permit their introduction or removal through the space 15 between the lugs 9. When the arms are engaged with the lugs, the arms are separated by their resilience and forced inwardly by inclined surfaces 10 of the lugs, thus securing the clamping action so that when the tail of a fish as 16 is arranged on the holder and the clamping arms engaged with the lugs, the fish is firmly secured to the holder. Thus secured the fish may be swung from side to side for scaling purposes or swung with the holder in upright position for other dressing operations.

The fish is very securely held and at the same time it is quickly engaged or released from the holder.

In the modification shown in Fig. VI the bracket is provided with a struck up spring portion 17, while the eye of the clamp member 18 has a boss 19 thereon adapted to coact with the spring portion to hold the clamp in its adjusted positions.

In Fig. V we illustrate the sheet metal blank 20 from which the holder member 7 is formed.

Our improved holder greatly facilitates the cleaning of fish, is light in weight, and may be carried about by the fisherman, and is easily kept in sanitary condition.

We have not attempted to illustrate and describe other embodiments or adaptations of our invention as we believe the disclosures made will enable those skilled in the art to which our invention relates to embody or adapt the same as may be desired.

Having thus described our invention, what we claim as new, and desire to secure by Letters Patent, is:

1. In a device of the class described, the combination of a base plate, a bracket provided with upwardly projecting ears mounted on said base plate and carrying a non-rotatable pivot, a holder mounted upon and frictionally engaging said pivot so that the holder may be swung from side to side and is held in its adjusted positions, said holder having spaced longitudinal grooves therein and forwardly projecting opposed rearwardly inclined lugs at its outer end, and a clamp comprising a pair of spring arms mounted on said pivot to swing with or independently of said holder and adapted to be engaged with said inclined lugs whereby the resiliency of the arms urges them toward the holder, said grooves thereof being positioned to receive said arms.

2. In a device of the class described, the combination of a base plate, a bracket mounted on said base plate and carrying a pivot, a holder mounted upon pivot so that the holder may be swung from side to side, said holder having spaced longitudinal grooves therein and forwardly projecting opposed rearwardly inclined lugs at its outer end, and a clamp comprising a pair of spring arms mounted on said pivot to swing with or independently of said holder and adapted to be engaged with said inclined lugs whereby the resiliency of the arms urges them toward the holder, said grooves thereof being positioned to receive said arms.

3. In a device of the class described, the combination of a base plate, a bracket provided with upwardly projecting ears mounted on said base plate and carrying a non-rotatable pivot, a holder mounted upon and frictionally engaging said pivot so that the holder may be swung from side to side and is held in its adjusted positions, said holder having forwardly projecting opposed rearwardly inclined lugs at its outer end, and a clamp comprising a pair of spring arms mounted on said pivot to swing with or independently of said holder and adapted to be engaged with said inclined lugs whereby the resiliency of the arms urges them toward the holder.

4. In a device of the class described, the combination of a base plate, a bracket mounted on said base plate and carrying a pivot, a holder mounted upon pivot so that the holder may be swung from side to side, said holder having forwardly projecting opposed rearwardly inclined lugs at its outer end, and a clamp comprising a pair of spring arms mounted on said pivot to swing with or independently of said holder and adapted to be engaged with said inclined lugs whereby the resiliency of the arms urges them toward the holder.

5. In a device of the class described, the combination of a base plate, a bracket provided with upwardly projecting ears mounted on said base plate and carrying a non-rotatable pivot, a holder formed of sheet metal provided with spaced knuckles frictionally engaging said pivot so that the holder may be swung from side to side and held in its adjusted position, said holder having spaced longitudinal grooves therein and forwardly projecting opposed rearwardly inclined lugs at its outer end, and a clamp formed of a loop of wire having an eye at its bight end engaging the pivot between the knuckles of said holder and serving with or independently thereof, the arms of said clamp being engageable with the lugs on said holder.

6. In a device of the class described, the combination of a base plate, a bracket mounted on said base plate and carrying a pivot, a holder formed of sheet metal provided with spaced knuckles engaging said pivot so that the holder may be swung from side to side, said holder having forwardly projecting opposed lugs, and a clamp formed of a loop of wire having an eye at its bight end engaging the pivot between the knuckles of said holder and swinging with or independently thereof, the arms of said clamp being engageable with the lugs on said holder.

7. In a device of the class described, the combination of a base plate, a holder pivotally mounted upon said base plate so that the holder may be swung from side to side, said holder having spaced longitudinal grooves therein and forwardly projecting opposed lugs at its outer end, and a clamp comprising a pair of spring arms mounted to swing with or independently of said holder and adapted to be engaged with said lugs.

8. In a device of the class described, the combination of a base plate, a holder pivotally mounted upon said base plate so that the holder may be swung from side to side, said holder having forwardly projecting opposed lugs, and a clamp comprising a pair of spring arms mounted to swing with or independently of said holder and adapted to be engaged with said lugs.

9. In a device of the class described, the combination of a base plate, and a holder pivotally mounted on said base plate to be swung from side to side to reverse a fish and support the same while resting upon said plate, said holder having a clamp thereon adapted to secure a fish thereto.

10. In a device of the class described, the combination of a base plate, and a fish holder pivotally mounted on said base plate to be swung from side to side to reverse a fish and support the same while resting upon said plate.

In witness whereof, we have hereunto set our hands and seals in the presence of two witnesses.

HERBERT MATTHEWS. [L. S.]
ROBERT J. SEATOR. [L. S.]

Witnesses:
  WILLIAM FLEMING,
  ELLA B. HICKS.